United States Patent [19]
Green

[11] Patent Number: 5,921,201
[45] Date of Patent: Jul. 13, 1999

[54] SQUIRREL-PROOF BIRD FEEDER

[76] Inventor: Duane Green, 47 Treetop Dr., Candler, N.C. 28715

[21] Appl. No.: 09/026,141

[22] Filed: Feb. 19, 1998

[51] Int. Cl.[6] .................................................. A01K 31/00
[52] U.S. Cl. ......................... 119/52.3; 119/429; 119/57.9
[58] Field of Search .................................. 119/52.3, 5.3, 119/429, 52.2, 23, 57.9, 52, 51, 523

[56] References Cited

U.S. PATENT DOCUMENTS

| | | | |
|---|---|---|---|
| 2,931,336 | 4/1960 | Cather | 119/52.3 |
| 3,124,103 | 3/1964 | Stainbrook | 119/52.3 |
| 4,523,546 | 6/1985 | Latham | 119/57.9 |
| 4,541,362 | 9/1985 | Dehls | 119/57.9 |
| 5,291,855 | 3/1994 | Laverty | 119/52.3 |
| 5,306,867 | 4/1994 | Cruz | 119/52.3 |
| 5,323,735 | 6/1994 | Meng | 119/52.3 |
| 5,479,877 | 1/1996 | Demboske | 119/23 |
| 5,490,480 | 2/1996 | Dumond | 119/57.9 |

FOREIGN PATENT DOCUMENTS

| | | | |
|---|---|---|---|
| 1345526 | 1/1974 | United Kingdom | 119/52.3 |

Primary Examiner—Michael J. Carone
Assistant Examiner—Judith A. Nelson

[57] ABSTRACT

A squirrel-proof bird feeder is provided including a housing having a cut out formed therein for defining a ledge and allowing access to the interior space. A squirrel guard is provided including a pivot frame residing within a single plane and defined by a pair of linear elongated side bars. At least one dowel is coupled between first ends of the side bars. A weighted bar is coupled between second ends of the side bars and has a weight less than that of an average squirrel. A center of each side bar is pivotally coupled to a central extent of opposite sides of a side wall of the housing. By this structure, the dowels remain level with the bottom face of the housing only when supporting an animal with a weight less than that of the average squirrel. The squirrel guard further includes at least one stanchion each coupled to an associated one of the side bars and a cover plate. The cover plate is coupled to the stanchion such that it resides above the pivot frame. When the dowels support an average squirrel, the cover plate precludes access to the food on the ledge of the housing.

1 Claim, 2 Drawing Sheets

SQUIRREL-PROOF BIRD FEEDER

BACKGROUND OF THE INVENTION

1. Field of the Invention

The present invention relates to bird feeders and more particularly pertains to a new squirrel-proof bird feeder for precluding access to a bird feeder by a small animal such as a squirrel.

2. Description of the Prior Art

The use of bird feeders is known in the prior art. More specifically, bird feeders heretofore devised and utilized are known to consist basically of familiar, expected and obvious structural configurations, notwithstanding the myriad of designs encompassed by the crowded prior art which have been developed for the fulfillment of countless objectives and requirements.

Known prior art bird feeders include U.S. Pat. No. 4,523, 546; U.S. Pat. No. 5,309,867; U.S. Pat. No. 5,375,558; U.S. Pat. No. 5,323,735; U.S. Pat. No. 5,291,855; and U.S. Pat. No. 4,541,362.

In these respects, the squirrel-proof bird feeder according to the present invention substantially departs from the conventional concepts and designs of the prior art, and in so doing provides an apparatus primarily developed for the purpose of precluding access to a bird feeder by a small animal such as a squirrel.

SUMMARY OF THE INVENTION

In view of the foregoing disadvantages inherent in the known types of bird feeders now present in the prior art, the present invention provides a new squirrel-proof bird feeder construction wherein the same can be utilized for precluding access to a bird feeder by a small animal such as a squirrel.

The general purpose of the present invention, which will be described subsequently in greater detail, is to provide a new squirrel-proof bird feeder apparatus and method which has many of the advantages of the bird feeders mentioned heretofore and many novel features that result in a new squirrel-proof bird feeder which is not anticipated, rendered obvious, suggested, or even implied by any of the prior art bird feeders, either alone or in any combination thereof.

To attain this, the present invention generally comprises a housing having a square bottom face with a peripheral side wall integrally coupled thereto and extending upwardly therefrom. As such, an interior space and an upper peripheral edge is defined. A roof includes a lower extent having a pair of slanted portions fixed to the upper peripheral edge of the side wall for defining an open top. Associated therewith is a planar upper extent removably coupled over the open top of the lower extent of the roof. The side wall has rectangular cut out formed therein for allowing access to the interior space. The bottom face has a post with a top end coupled to central extent thereof and depending downwardly therefrom for supporting the housing. Next provided is a removable plate having a planar rectangular configuration and a width equal to that of the housing. During use, the plate is adapted to be removably situated within a slot formed in the lower extent of the roof. As shown in FIGS. 1 & 2, the removable plate resides within an angle plane. Upon feed being deposited within the open top of the roof, such feed is transferred adjacent to the rectangular cut. Finally, a squirrel guard resides within a single plane and includes a pivot frame. The pivot frame is defined by a pair of linear elongated side bars each having a length twice that of the housing. A plurality of dowels having a width equal to that of the housing are coupled between first ends of the side bars along parallel axes. Coupled between second ends of the side bars is a weighted bar having a weight less than that of an average squirrel. As shown in FIG. 1, a center of each side bar is pivotally coupled to a central extent of opposite sides of the side wall of the housing and level with the bottom face. The dowels thus remain level with the bottom face of the housing only when supporting an animal with a weight less than that of the average squirrel. See FIG. 1. The squirrel guard further includes a pair of angled stanchions each coupled to an associated one of the side bars and extended upwardly and toward the first ends thereof. A cover plate is provided having a width equal to that of the housing. The cover plate is coupled between top ends of the stanchions such that it resides within an angled plane. In use, when the dowels support an average squirrel, the cover plate precludes access to the food through the rectangular cut out of the housing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new squirrel-proof bird feeder apparatus and method which has many of the advantages of the bird feeders mentioned heretofore and many novel features that result in a new squirrel-proof bird feeder which is not anticipated, rendered obvious, suggested, or even implied by any of the prior art bird feeders, either alone or in any combination thereof.

It is another object of the present invention to provide a new squirrel-proof bird feeder which may be easily and efficiently manufactured and marketed.

It is a further object of the present invention to provide a new squirrel-proof bird feeder which is of a durable and reliable construction.

An even further object of the present invention is to provide a new squirrel-proof bird feeder which is susceptible of a low cost of manufacture with regard to both materials and labor, and which accordingly is then susceptible of low prices of sale to the consuming public, thereby making such squirrel-proof bird feeder economically available to the buying public.

Still yet another object of the present invention is to provide a new squirrel-proof bird feeder which provides in the apparatuses and methods of the prior art some of the advantages thereof, while simultaneously overcoming some of the disadvantages normally associated therewith.

Still another object of the present invention is to provide a new squirrel-proof bird feeder for precluding access to a bird feeder by a small animal such as a squirrel.

Even still another object of the present invention is to provide a new squirrel-proof bird feeder that includes a housing having a cut out formed therein for defining a ledge and allowing access to the interior space. A squirrel guard is provided including a pivot frame residing within a single plane and defined by a pair of linear elongated side bars. At least one dowel is coupled between first ends of the side bars. A weighted bar is coupled between second ends of the side bars and has a weight less than that of an average squirrel. A center of each side bar is pivotally coupled to a central extent of opposite sides of a side wall of the housing. By this structure, the dowels remain level with the bottom face of the housing only when supporting an animal with a weight less than that of the average squirrel. The squirrel guard further includes at least one stanchion each coupled to an associated one of the side bars and a cover plate. The cover plate is coupled to the stanchion such that it resides above the pivot frame. When the dowels support an average squirrel, the cover plate precludes access to the food on the ledge of the housing.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
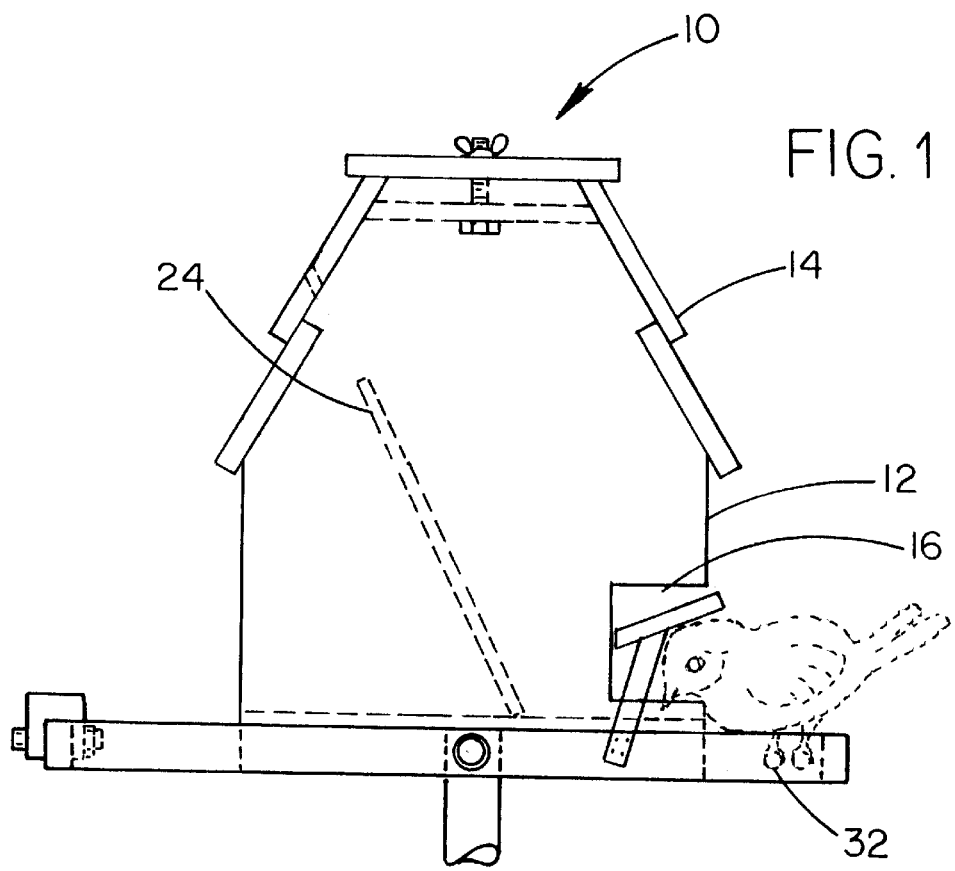
FIG. 1 is a side view of a new squirrel-proof bird feeder according to the present invention.

With reference now to the drawings, and in particular to FIGS. 1 through 6 thereof, a new squirrel-proof bird feeder embodying the principles and concepts of the present invention and generally designated by the reference numeral 10 will be described.

The present invention, designated as numeral 10, includes a housing 12 having a square bottom face with a peripheral side wall integrally coupled thereto and extending upwardly therefrom. As such, an interior space and an upper peripheral edge is defined. A roof 14 includes a lower extent having a pair of slanted portions fixed to the upper peripheral edge of the side wall for defining an open top. Associated therewith is a planar upper extent removably coupled over the open top of the lower extent of the roof. Such is preferably accomplished by way of a bolt and wing nut combination which is attachable to a cross bar positioned across the open top of the roof.

The side wall has rectangular cut out 16 formed therein for allowing access to the interior space. As shown in FIG. 1, the cut out not only spans along an entire length of one of the side faces, but also spans at least ⅙ a length of opposed side faces situated adjacent to the aforementioned side face. As such, a ledge 18 is defined. While not shown, the top face and vertical face of the rectangular cut out are closed for reasons that will become apparent hereinafter. The bottom face of the housing has a post 20 with a top end coupled to central extent thereof and depending downwardly therefrom for supporting the housing.

Figure 2:
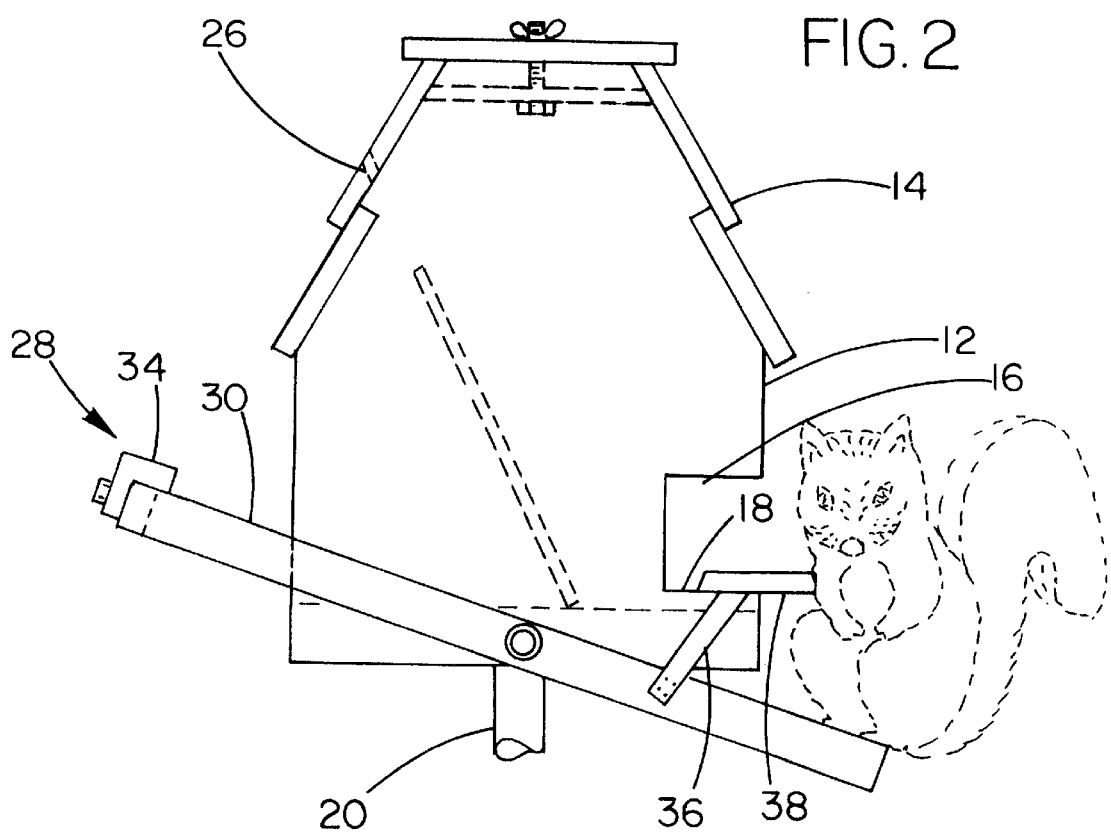
FIG. 2 is a side view of the present invention showing the squirrel guard in the employed orientation.
Figure 6:
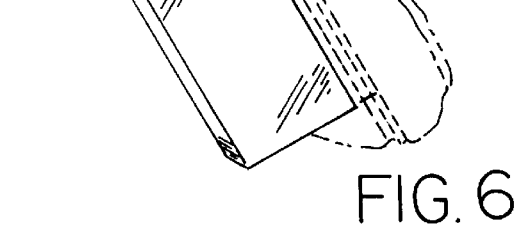
FIG. 6 is a detailed perspective view of the removable plate of the present invention.

Next provided is a removable plate 24 having a planar rectangular configuration and a width equal to that of the housing. During use, the plate is adapted to be removably situated within a slot 26 formed in the lower extent of the roof. Ideally, grooves are formed in the housing for maintaining the plate in its proper orientation, as shown in FIG. 6. As shown in FIGS. 1 & 2, the removable plate resides within an angled plane during use. Upon feed being deposited within the open top of the roof, such feed is transferred adjacent to the rectangular cut.

Finally, a squirrel guard 28 resides within a single plane and includes a pivot frame. The pivot frame is defined by a pair of linear elongated side bars 30 each having a length twice that of the housing. At least three dowels 32 having a width equal to that of the housing are coupled between first ends of the side bars along parallel axes. Coupled between second ends of the side bars is a weighted bar 34 having a weight less than that of an average squirrel.

Figure 3:
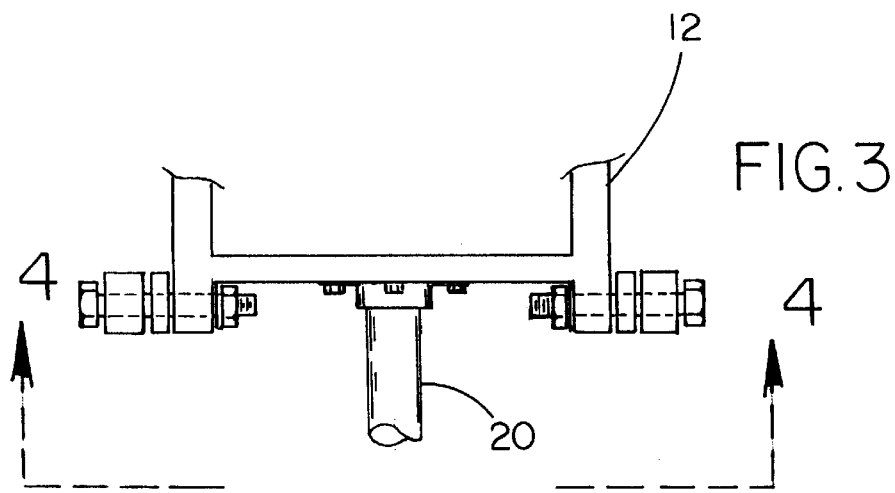
FIG. 3 is an end view of the present invention showing the pivotable coupling of the squirrel guard.
Figure 4:
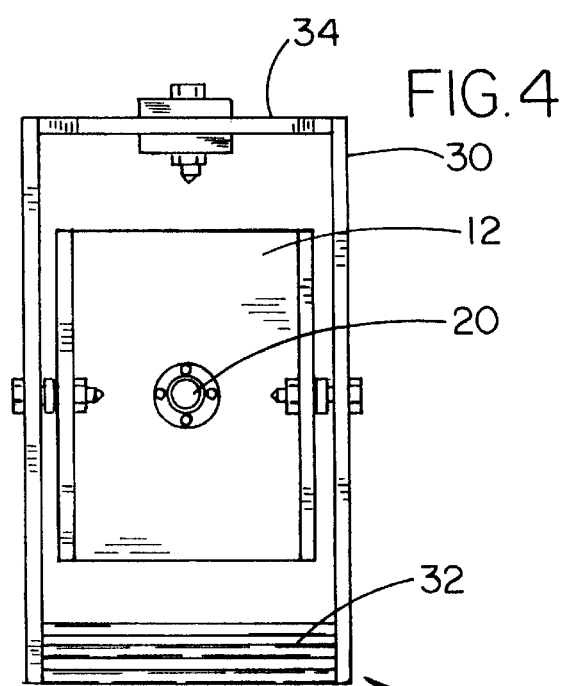
FIG. 4 is a bottom view of the present invention.
Figure 5:
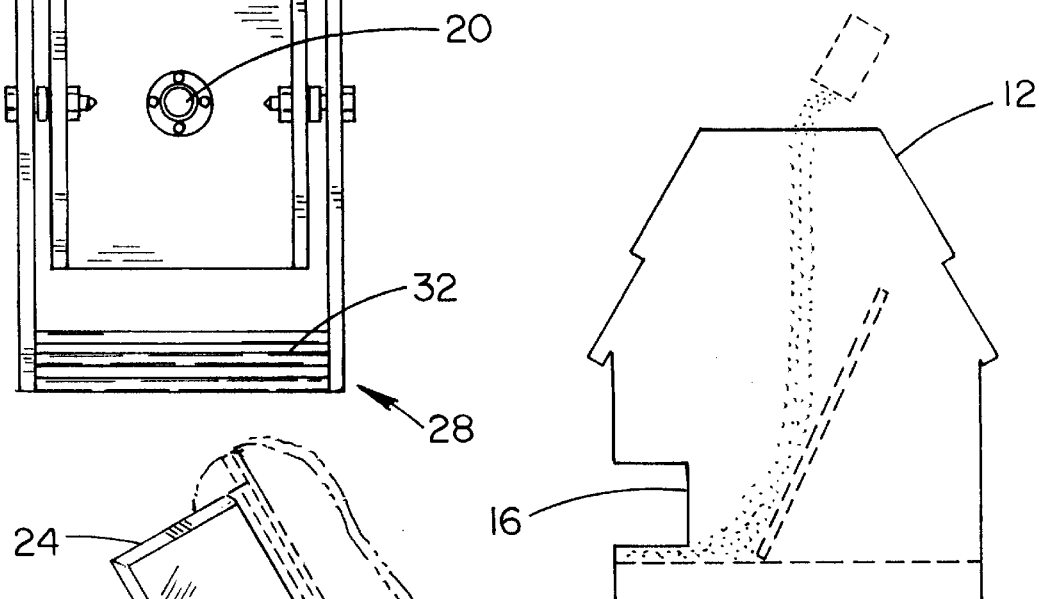
FIG. 5 is a side view of the present invention with the feed being inserted therein.

As shown in FIG. 1, a center of each side bar is pivotally coupled to a central extent of opposite sides of the side wall of the housing and level with the bottom face. In the preferred embodiment, a spacer is situated between the housing and a head of a bolt used to effect the foregoing coupling. As shown in FIG. 3, the bottom face has downwardly extending lips onto which the side bars are coupled. As such, the dowels thus remain approximately level with the bottom face of the housing only when supporting an animal with a weight less than that of the average squirrel. See FIG. 1.

The squirrel guard further includes a pair of angled stanchions 36 each coupled to an associated one of the side bars and extended upwardly and toward the first ends thereof. A cover plate 38 is provided having a width equal to that of the housing. The cover plate is coupled between top ends of the stanchions such that it resides within an angled plane. Preferably, the plane in which the cover plate resides is situated along a radial line extending from the axis about which the frame pivots. Such radial line ideally forms about a 30 degree angle with the frame. In use, when the dowels support an average squirrel, the cover plate precludes access to the food through the rectangular cut out of the housing. In its relaxed orientation, the cover plate abuts the housing to maintain the frame level.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A squirrel-proof bird feeder comprising, in combination:

a housing having a square bottom face with a peripheral side wall including a plurality of side faces integrally coupled thereto and extending upwardly therefrom for defining an interior space and an upper peripheral edge and a roof including a lower extent having a pair of slanted portions fixed to the upper peripheral edge of the side wall for defining an open top and a planar upper extent removably coupled over the open top of the lower extent of the roof via a bolt and wing nut combination which is attachable to a cross bar positioned across the open top of the roof, the side wall having rectangular cut out formed therein for allowing access to the interior space, wherein the cut out is spaced from the bottom face of the housing and spans along an entire length of a first one of the side faces and about ⅙ a length of opposed side faces situated adjacent to said first side face thereby defining a ledge, wherein a top face and a vertical face defined by the cut out are closed, the bottom face having a post with a top end coupled to central extent thereof and depending downwardly therefrom for supporting the housing;

a removable plate having a planar rectangular configuration and a width equal to that of the housing, the plate adapted to be removably situated within at least one slot formed in one of the side faces of the housing and removably situated within a slot formed in the lower extent of the roof such that it resides within an angle plane, whereby upon feed being deposited within the open top of the roof, such feed is transferred adjacent to the rectangular cut; and a squirrel guard residing within a single plane and including a pivot frame defined by a pair of linear elongated side bars each having a length twice that of the housing, a plurality of dowels each having a width equal to that of the housing wherein the dowels are coupled between first ends of the side bars along parallel axes, and a weighted bar coupled between second ends of the side bars and having a weight less than that of an average squirrel, wherein a center of each side bar is pivotally coupled to a central extent of opposite sides of the side wall of the housing and level with the bottom face via a bolt and a spacer, whereby the dowels remain level with the bottom face of the housing only when supporting an animal with a weight less than that of the average squirrel, the squirrel guard further including a pair of angled stanchions each coupled to an associated one of the side bars and extending upwardly and toward the first ends thereof and a cover plate having a width equal to that of the housing, wherein the cover plate is coupled between top ends of the stanchions such that it resides within an angled plane of about 30 degrees with respect to the side bars of the squirrel guard and extending radially from an axis coincident with an axis about which the squirrel guard pivots;

whereby when the dowels support an average squirrel, the cover plate precludes access to the food through the rectangular cut out of the housing.

* * * * *